C. E. CANELL.
POULTRY FEEDER.
APPLICATION FILED OCT. 24, 1921.
1,424,079.
Patented July 25, 1922.
3 SHEETS—SHEET 1.
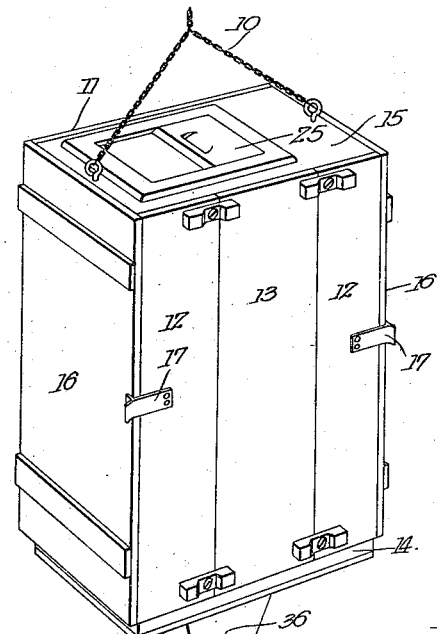
Fig. 1.
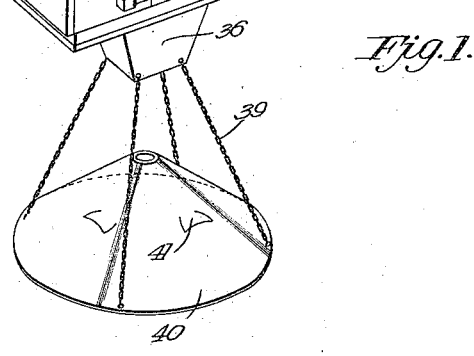
Fig. 3.
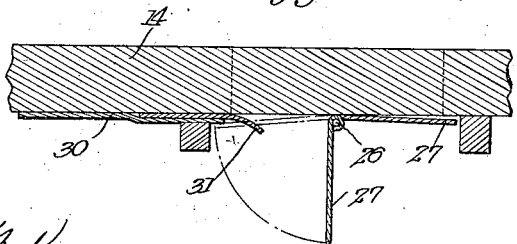
C. E. Canell,
INVENTOR
BY Victor J. Evans
ATTORNEY
WITNESS:

C. E. CANELL.
POULTRY FEEDER.
APPLICATION FILED OCT. 24, 1921.
1,424,079.
Patented July 25, 1922.
3 SHEETS—SHEET 2.
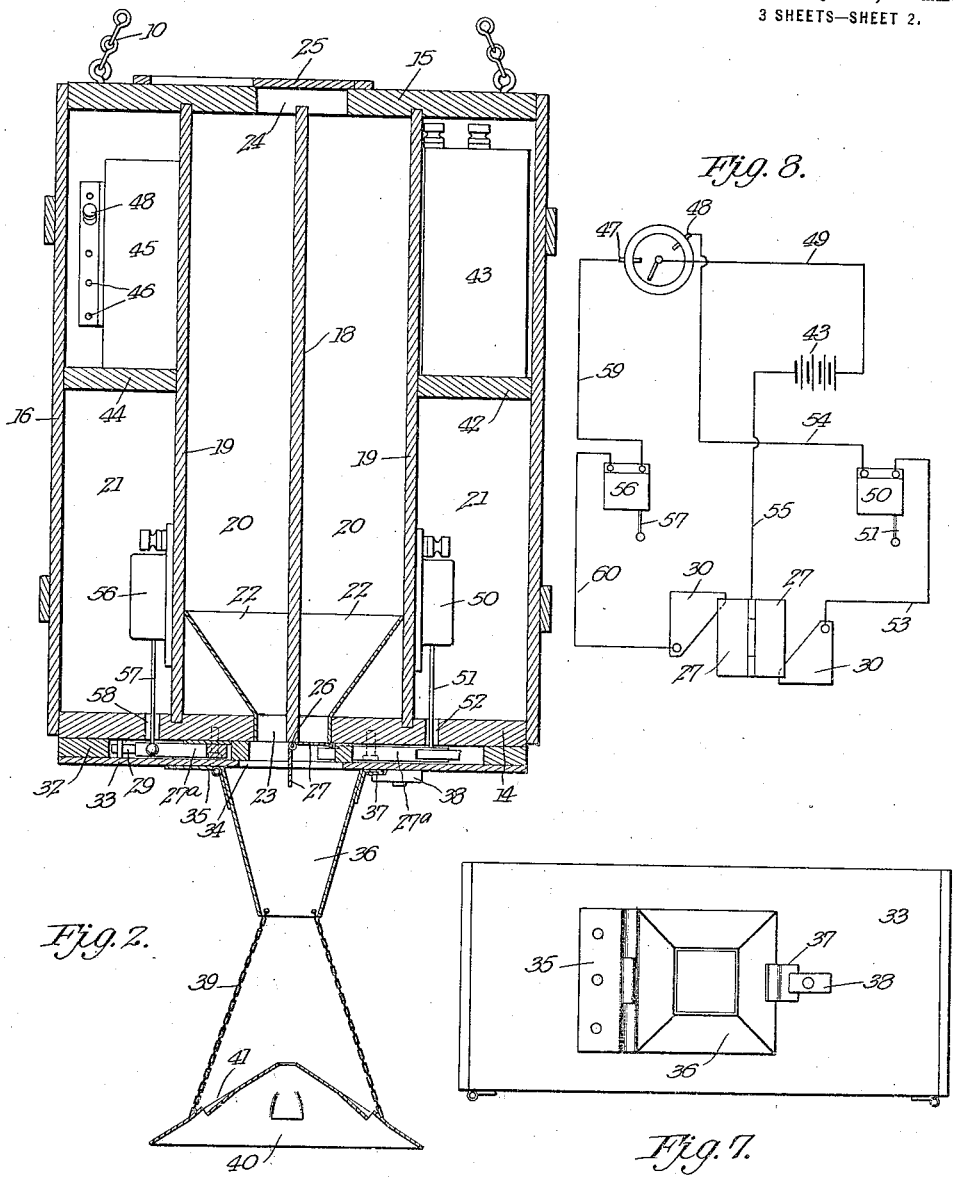
C. E. Canell,
INVENTOR
BY Victor J. Evans
ATTORNEY
WITNESS:

C. E. CANELL.
POULTRY FEEDER.
APPLICATION FILED OCT. 24, 1921.

1,424,079.

Patented July 25, 1922.
3 SHEETS—SHEET 3.

C. E. Canell
INVENTOR

BY Victor J. Evans
ATTORNEY

WITNESS:

UNITED STATES PATENT OFFICE.

CHARLES EDWARD CANELL, OF PORTLAND, OREGON, ASSIGNOR OF ONE-HALF TO EDWARD T. WHITE, OF EVERETT, WASHINGTON.

POULTRY FEEDER.

1,424,079.   Specification of Letters Patent.   Patented July 25, 1922.

Application filed October 24, 1921. Serial No. 509,909.

*To all whom it may concern:*

Be it known that I, CHARLES E. CANELL, a citizen of the United States, residing at Portland, in the county of Multnomah and State of Oregon, have invented new and useful Improvements in Poultry Feeders, of which the following is a specification.

This invention relates to poultry feeding devices and has for its object the provision of a time controlled automatically operated feeding mechanism whereby poultry may be fed at different periods during the day in the absence of the owner or other person having charge of them, the arrangement being such that successive feedings will be given without any attention other than initially setting the device, for instance in the morning.

An important and more specific object is the provision of automatically operated time controlled means of this character embodying a clock, a source of current, and a plurality of buzzers of ordinary type adapted to operate catches which will release trap doors to permit discharge of the grain, the arrangement being such that a novel circuit breaking means is provided for breaking the circuit through a buzzer when the corresponding door is opened so as to avoid waste of grain.

Another object is the provision of a device of this character which is equipped with novel spreading means which will serve to deflect the falling grain and distribute it over a relatively large area so that a considerable number of fowls may readily feed without unnecessary crowding and trampling.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 5:
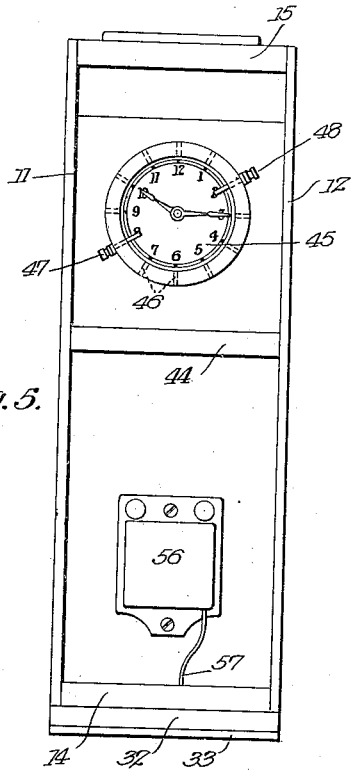
Figure 6:
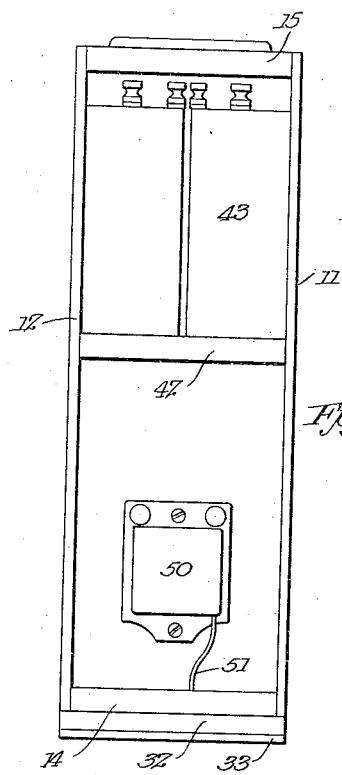
Figure 4:
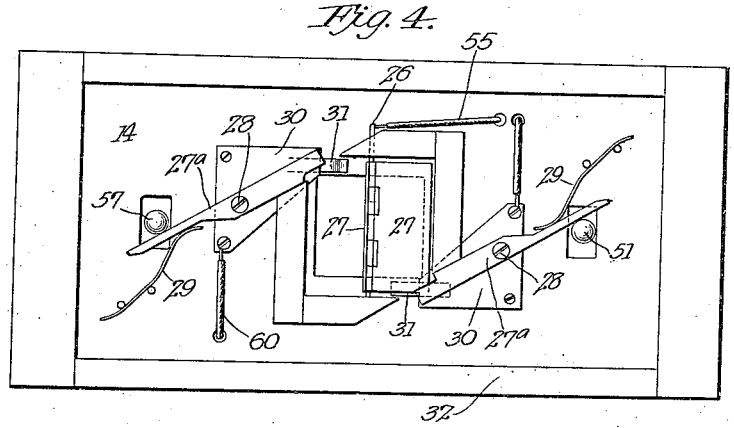

Figure 1 is a perspective view of my device in set-up position ready for use,

Figure 2 is a vertical longitudinal sectional view therethrough, one trap door being closed and the other open, Figure 3 is an enlarged sectional view taken through the lower portion of the device, Figure 4 is a horizontal sectional view, Figure 5 is an elevation of one side of the device with the cover removed, Figure 6 is an elevation of the opposite side with its cover removed, Figure 7 is a detail bottom view showing the means for holding the spreading mechanism in position, Figure 8 is a diagrammatic view illustrating the electrical circuit.

Referring more particularly to the drawings, I have shown my device as comprising a rectangular casing adapted to be suspended where its use is desired, as by means of a chain 10 or the like. This casing may be constructed of wood or metal and may be of any desired size depending upon the size of the flock of poultry it is intended to feed. The casing includes a back wall 11, a front wall 12 provided with a removable panel 13, a bottom 14, a top 15, and hinged sides 16 adapted to be held closed by any suitable catches 17. Extending vertically at the center of the casing is a partition 18 and disposed at the sides of this partition are other partitions 19 which define inner compartments 20 and outer compartments 21.

The inner compartments 20 are designed to contain the grain to be fed to the poultry and disposed at the lower end thereof are funnel-shaped members 22 which lead to an opening 23 in the bottom 14, this opening extending beyond both sides of the central partition. The top 15 is provided with an opening 24 through which grain is poured into either or both of the compartments 20 and this opening 24 is normally closed by a slidable cover plate 25. Extending across the opening 23 in line with the central partition 18 is a pintle 26 upon which are hinged trap doors 27 which are for the purpose of closing the opening 23 and which are normally held closed by bars 27$^a$ pivoted intermediate their ends, as shown at 28. Leaf springs 29 are provided for urging these bars 27$^a$ into engagement over the corners of the trap doors. The numeral 30 designates metallic plates, here shown as being triangular, which are secured upon the underside of the bottom 14 and which contact with the trap doors when the latter are in closed position. The numeral 31 designates leaf springs which are located at the corners of the trap doors and which are for the purpose of forcing the trap doors open when the bars 27ª are moved into releasing position by the mechanism to be described. Secured on the underside of the bottom 14 is an open frame 32 beneath which is secured a bottom cover plate 33 provided with a central opening 34 for the outlet of the grain when the trap doors are opened. Secured on the underside of this bottom cover plate 33 is a hinged leaf 35 to which is pivoted an inverted frusto-pyramidal hopper 36. The opposite side of the hopper is formed with an outwardly extending lip 37 over which is engageable a turn button 38 pivoted on the underside of the cover 33 whereby to hold the hopper firmly in position immediately beneath the opening 34. Suspended beneath the hopper by suitable chains 39 or the like, is a spreader 40 preferably of conical shape and which may, if preferred, be provided with a plurality of holes 41 through which some of the grain may fall while some will be deflected upon striking the spreader so as to scatter it over a comparatively large area.

Secured within one of the compartments defined between a partition 19 and the adjacent side 16 is a transverse partition 42 upon which are disposed dry cells 43 or other preferred source of electrical current while secured within the other opposite corresponding compartment is a horizontal partition 44 upon which is mounted a clock 45 which has its face formed with a plurality of holes 46 in the desired ones of which may be inserted contact plugs 47 and 48 adapted to be engaged by the clock hands, as shown. Connected with one terminal of the battery is a wire 49 which leads beneath the bottom 14 and which is grounded on the clock works. Disposed within the space below the partition 42 is a buzzer 50 which has its clapper 51 extending through a hole 52 in the bottom in position to engage the outer end of the associated bar 27. Connected with one terminal of the buzzer is a wire 53 which is connected with the associated triangular plate 30 and connected with the other terminal of this buzzer is a wire 54 which is connected with one of the contact plugs 47 or 48. The other terminal of the battery is connected by a wire 55 with the pintle 26. Located at the opposite side of the device beneath the partition 44 is a similar buzzer 56 which has its clapper 57 extending through a hole 58 in the bottom 14 in position to engage the associated bar 27, as shown. One terminal of this buzzer is connected by a wire 59 with the other plug 47 or 48 and the other terminal of this buzzer is connected by a wire 60 with the associated triangular plate 30. In the operation of the device, the operator places the plugs 47 and 48 in the proper holes on the clock face so that they will be engaged by the hour hand of the clock at the time when it is desired to feed the poultry. The trap doors 27 are closed and will be held closed by the engagement of the bars 27ª therewith. The grain to be fed is then poured into the two compartments 20 through the opening 24. When the time arrives for the feeding, that is when the hour hand engages the first contact 47 or 48, the circuit will be closed through one of the buzzers whereupon the clapper thereof striking against the associated bar 27ª will move the bar so that one of the trap doors will be forced open by the leaf spring 31. As soon as the trap door is opened the grain within the associated compartment 20 will drop out into the hopper 36 and be scattered by the spreader 40. The moment that the trap door opens it will be apparent that the circuit will be broken, as the trap door will then no longer engage the triangular plate 30 and the buzzer will cease to operate. When the hour hand of the clock strikes the other contact 47 or 48 the other buzzer will be energized and the other trap door will be opened in exactly the same manner.

From the foregoing description and a study of the drawings it will be apparent that I have thus provided a simply constructed and consequently inexpensive automatic device for feeding poultry at certain predetermined times during the absence of the owner or custodian of the flock, the device being of material advantage inasmuch as it requires no attention other than the initial setting of the contact plugs in the proper holes and the filling of the device with grain.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, I claim:

1. A feeder of the character described comprising a casing provided with filling means whereby grain may be introduced thereinto, the casing being provided in its bottom with an outlet opening, a trap door normally closing said opening, a spring-pressed catch engaging said trap door whereby to hold the same closed, and time controlled electrically operated means mounted within the casing for moving said catch out of engagement with the trap door, said means including a clock switch mounted directly within the casing.

2. A feeder of the character described comprising a casing provided with filling means whereby grain may be introduced thereinto, the casing being provided in its bottom with an outlet opening, a trap door normally closing said opening, a spring-pressed catch engaging said trap door whereby to hold the same closed, and time controlled electrically operated means mounted within the casing for moving said catch out of engagement with the trap door, said means comprising a buzzer mounted at one side of the casing and having a keeper engaging the catch, and a circuit closer associated with the clock mehanism and connected in circuit with a source of current and the buzzer, said means including a clock switch mounted directly within the casing.

3. A feeder of the character described comprising a casing provided with filling means whereby grain may be introduced thereinto, the casing being provided in its bottom with an outlet opening, a trap door normally closing said opening, a spring-pressed catch engaging said trap door to hold the same closed, and time controlled electrically operated means within the casing for moving said catch out of engagement with the trap door, said means comprising a buzzer mounted at one side of the casing and having a keeper engaging the catch, a circuit closer associated with the clock mechanism and connected in circuit with a source of current and the buzzer, and a metallic plate interposed in the circuit and engaged by the trap door when the latter is closed, the trap door being likewise included in the circuit whereby when the trap door is open the circuit through the buzzer will be broken.

4. A device of the character described comprising a casing, a vertical partition therein defining inner compartments adapted to contain grain, the top of the casing being provided with a filling opening leading into said compartments and the bottom being provided with a discharge opening common to both compartments, a pair of hinged trap doors for closing said discharge opening, other partitions within the casing defining a pair of outer compartments, an electric battery within one of said outer compartments, a clock in the other outer compartment, catch members pivoted beneath the bottom and engaging said trap doors for holding the latter normally closed, buzzers within the lower portions of said outer compartments and having clappers extending through the bottom and engaging said catch members, a pair of plugs disposable on the clock face at selected points in the path of travel of the hour hand, said plug being connected in circuit with the battery and said buzzers.

5. A device of the character described comprising a casing, a vertical partition therein defining inner compartments adapted to contain grain, the top of the casing being provided with a filling opening leading into said compartments and the bottom being provided with a discharge opening common to both compartments, a pair of hinged trap doors for closing said discharge opening, other partitions within the casing defining a pair of outer compartments, an electric battery within one of said outer compartments, a clock in the other outer compartment, catch members pivoted beneath the bottom and engaging said trap doors for holding the latter normally closed, buzzers within the lower portions of said outer compartment and having clappers extending through the bottom and engaging said catch members, a pair of plugs disposable on the clock face at selected points in the path of travel of the hour hand, said plugs being connected in circuit with the battery and said buzzers, the trap doors being metallic and having a common pintle connected in the circuit, and metallic plates on the bottom engaged by the doors when the latter are in closed position, said plates being likewise in the circuit whereby upon opening of a trap door the circuit through the associated buzzer will be broken.

In testimony whereof I affix my signature.

CHARLES EDWARD CANELL.